Sept. 11, 1962   H. H. VAN DER VELDEN   3,052,900
THREAD LENGTH CONTROL DEVICE FOR PIPE THREADERS
Filed Oct. 19, 1959   2 Sheets-Sheet 1

INVENTOR.
HANS H. VAN DER VELDEN
BY
ATTORNEYS

Sept. 11, 1962    H. H. VAN DER VELDEN    3,052,900
THREAD LENGTH CONTROL DEVICE FOR PIPE THREADERS
Filed Oct. 19, 1959    2 Sheets-Sheet 2
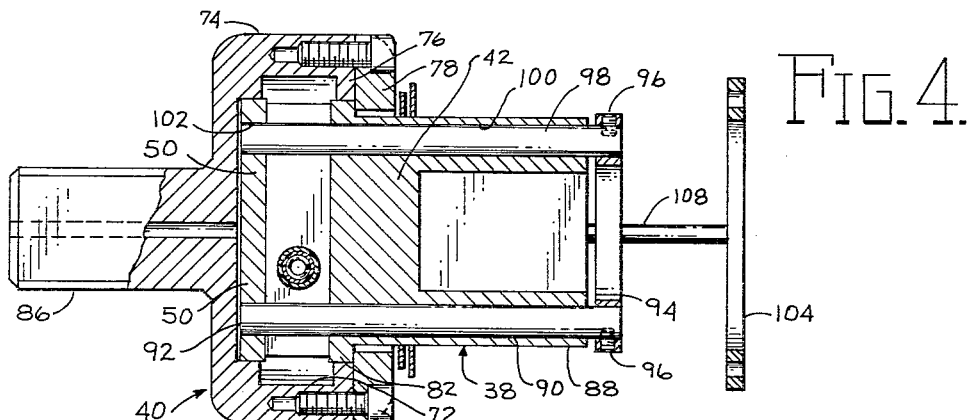
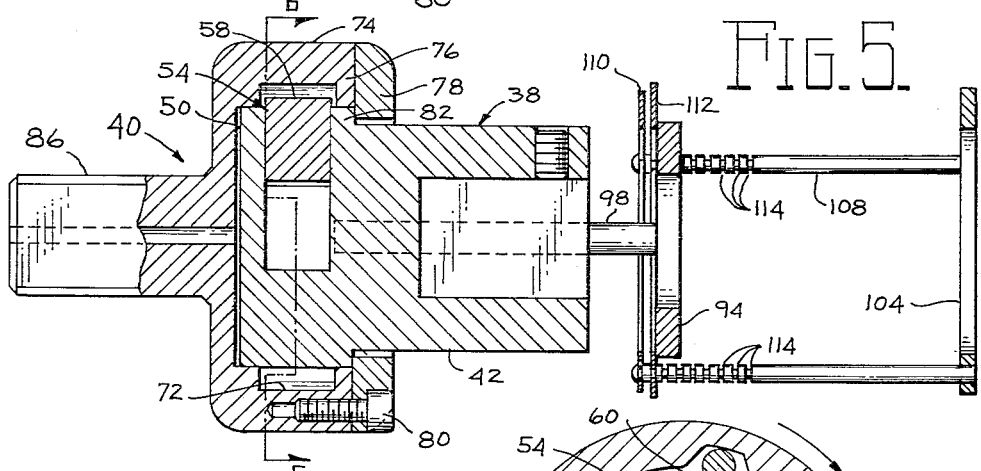
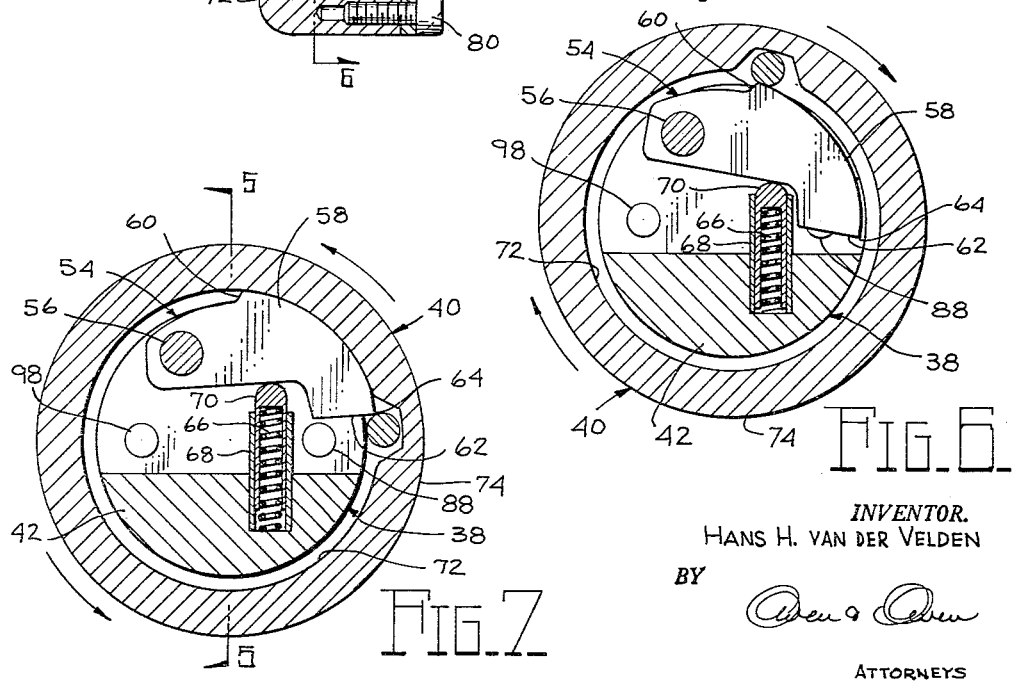
INVENTOR.
HANS H. VAN DER VELDEN
BY
ATTORNEYS United States Patent Office 3,052,900
Patented Sept. 11, 1962

3,052,900
THREAD LENGTH CONTROL DEVICE FOR
PIPE THREADERS
Hans H. van der Velden, Jackson, Mich., assignor to The
Toledo Pipe Threading Machine Company, Toledo,
Ohio, a corporation of Ohio
Filed Oct. 19, 1959, Ser. No. 847,226
6 Claims. (Cl. 10—105)

This invention relates to an improved thread length control device for pipe threaders or the like.

Thread length control devices are particularly useful where pipes of varying diameters are to be threaded in a single machine, since industry standards have been adopted which require that for pipe of a given outside diameter the threads shall be cut to a specified distance from the end. A certain element of control results from the proper selection and design of the thread chaser guide posts, but this control is insufficient if rigid thread length standards are to be met.

The present invention provides an improved thread length control device which can be detachably connected to a pipe threader and which can be used with many pipe threaders now on the market which have no such control. A single control can also be used for a number of threaders, thus enabling one who needs several different threaders to buy less expensive ones without such controls, and a single thread length control device for use with all of them. The new control has a positive disengagement release which does not place undue strain on gear teeth or other parts of the threader during disengagement, as is true of most known control devices.

It is, therefore, a principal object of the invention to provide an improved thread length control device for pipe threaders.

Another object of the invention is to provide a thread length control device which can be detachably connected individually to one or more pipe threaders.

Still another object of the invention is to provide an improved thread length control device which produces less strain on the threader parts at the time of disengagement.

Other objects and advantages of the invention will be suggested from the following detailed description of a preferred embodiment thereof, reference being made to the accompanying drawing, in which:

FIG. 4 is a cross-sectional view taken along the line 4—4 of FIG. 3;

FIG. 5 is a cross-sectional view taken along the line 5—5 of FIG. 7, showing the thread length control device after the desired length of threads have been cut;

FIG. 6 is a cross-sectional view taken along the line 6—6 of FIG. 5; and

FIG. 7 is a cross-sectional view similar to FIG. 6 but with a part thereof moving in a reverse direction.

Figure 1:
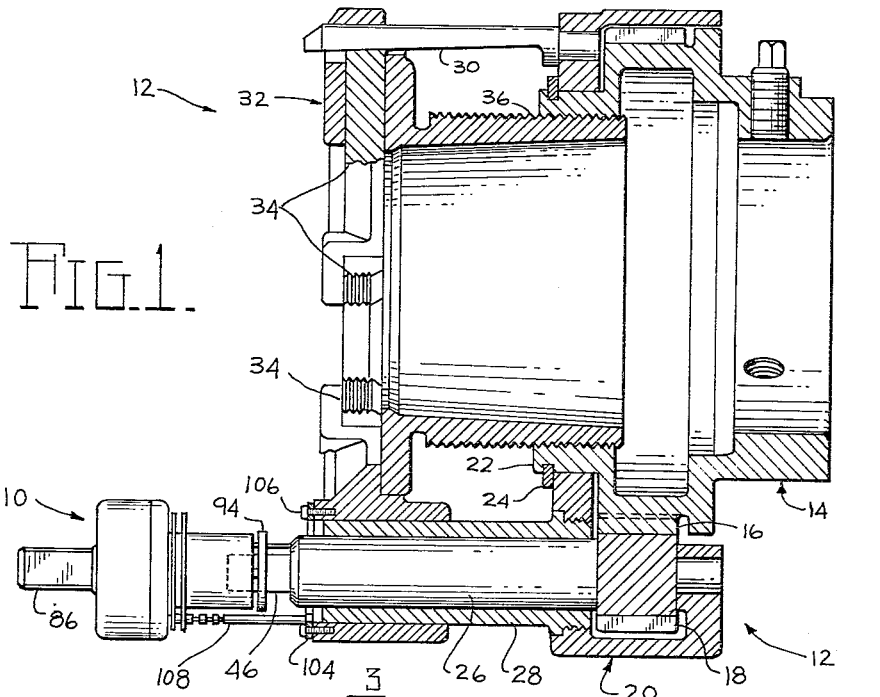
FIG. 1 is a cross-sectional view of a typical pipe threader with an attached thread length control device according to the invention shown in elevation.

Referring to the drawing, and more particularly to FIG. 1, a thread length control device 10 according to the invention is shown attached to a suitable pipe threader indicated generally at 12. The pipe threader 12 includes a pipe holder 14 which is adapted to be attached to a pipe by screws or the like, close to the end of the pipe which is to be threaded. The holder 14 has a ring gear 16 engaged by a pinion gear 18 located in a housing 20 which is rotatably mounted on an extension 22 of the holder 14 and is guided against endwise movement relative to the pipe or work by a retaining ring 24. The housing 20 encloses both the pinion gear 18 and the ring gear 16.

The pinion gear 18 is connected to a drive shaft 26 which extends outwardly of the threader 12 in a bearing sleeve 28, which is affixed to the housing 20. Conventional chaser guide posts 30 can also extend outwardly from the housing 20. The bearing sleeve 28 and the chaser posts 30 extend through a chaser frame 32 which carries chasers 34.

When the drive shaft 26 is rotated, the pinion gear 18 travels around the stationary ring gear 16 and carries with it the housing 20, the drive shaft 26, the bearing sleeve 28, the chaser frame 32, and the chasers 34. The chasers 34 cut threads in a pipe when they are rotated and are fed axially forward on the pipe by means of threads 36 of the chaser frame 32 which move into the work holder 14. The depth of the threads cut in the pipe are controlled by the configuration of chaser posts 30, as is well known in the art.

Industry standards have been adopted which require that for every different outside diameter of pipe to be threaded there shall be threads cut to a specified length from the end of the pipe. While this length can be controlled to a certain extent by the configuration of the chaser posts 30, such control alone is not sufficiently accurate to meet close specifications. Close thread length control is made available to most existing machines by the present invention which acts as an intermediate connection between the drive shaft 26 of the existing machine and the known power drive and disengages one from the other when threads of a predetermined length have been cut on a pipe.

Figure 2:
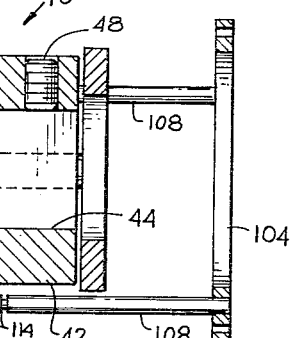
FIG. 2 is an enlarged, detailed cross-sectional view of the thread length control device taken along the line 2—2 of FIG. 3.

Referring more particularly to FIG. 2, the control device 10 includes a driven member 38 and a drive member 40 which are normally connected to one another but which are disconnected when threads of a predetermined length have been cut. The driven member 38 has a main body 42 including a non-circular recess 44 for receiving a non-circular (usually square) end 46 (FIG. 1) of the drive shaft 26 to which the driven member 38 is affixed by means of a set screw 48 or any other suitable means. The power drive is attached directly to the square end 46 of the drive shaft in conventional pipe threaders. The present invention is thus an "adapter" which fits between the square end and the socket of the power drive.

The main body 42 of the driven member 38 and a plate 50, which can be integral therewith, form a cam or clutch chamber 52 in which a cam or clutch actuating dog 54 is pivotally mounted by a pivot pin 56 (FIG. 3) held by the main body 42 and the plate 50. The cam 54 includes an outer arcuate edge 58 having an offset portion 60 and a supporting pin engaging edge 62, at a sharp angle to the arcuate edge 58 and meeting therewith at a point 64. A spring 66 in a tube 68 held by a portion of the main body 42 under the chamber 52 urges a spring member 70 outwardly to force the cam 58 against the periphery of an annular recess 72 formed by a cylindrical portion 74 of the driven member 40 and an annular ridge 76. An annular flange 78 is attached to the ridge 76 by screws 80 or other suitable means and fits over a shoulder 82 of the main body 42 to prevent lateral separation of the driven member 38 and the drive member 40.

Figure 3:
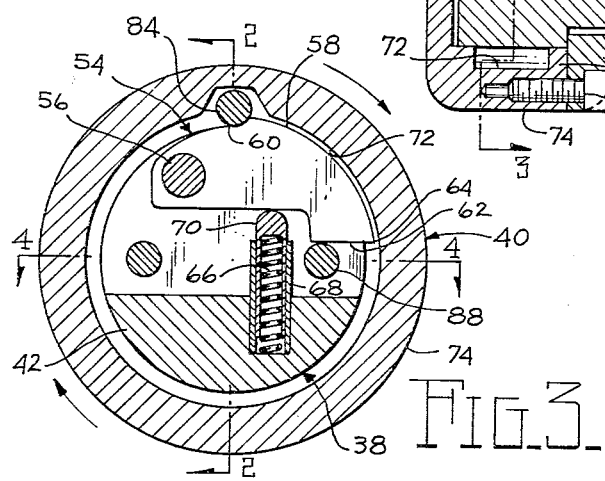
FIG. 3 is a cross-sectional view taken along the line 3—3 of FIG. 2.

A drive pin 84 is held in the cylindrical portions 74, the ridge 76 and the annular flange 78, and extends through the annular recess 72. The pin 84 engages the offset 60 of the cam 54 to establish driving engagement between the driven member 38 and the drive member 40 which has a drive head 86 projecting rearwardly for driving engagement with any suitable means normally used to engage the drive end 44 of the drive shaft 26. The cam 54 is held in its outward position with the offset 60 in engagement with the drive pin 84 by means of a supporting post 88 slidably held in a passage 90 (FIG. 4) in the main body 42 and in a hole 92 in the plate 50. The outer end of the supporting post 88 is affixed to a connecting ring 94 by set screws 96 (FIG. 4) or the like. A guide post 98, similarly affixed to the connecting ring 94, is located diametrically opposite the supporting post 88 and is slidably held in a passage 100 in the main body 38 and in a hole 102 in the plate 50. The guide post 98 aids in maintaining the connecting ring 94 in alignment with the drive end receiving recess 44 and also prevents the post 88 from binding as it moves in and out. As long as the supporting post 88 extends through the chamber 52, the drive pin 84 will engage the offset 60 of the cam 54 when the drive member 40 is rotated in a clockwise direction (as seen in FIG. 3).

A follower ring 104 is used to engage the connecting ring 94 and pull the supporting post 88 out of the chamber 52 when a predetermined length of thread has been cut, thereby to disengage the cam 54 from the drive pin 84 and enable the drive member 40 to rotate freely of the driven member 38. Toward this purpose, the ring 104 is attached to the chaser frame 32 by screws 106 or the like and moves therewith. Connecting rods 108 connect the follower ring 104 to a guide ring 110 at the ends thereof and to a disengaging ring 112 which is removably attached to the connecting rods 108 at any of several sets of grooves 114 therein to determine the distance the follower ring 104 will travel before the disengaging ring 112 engages the connecting ring 94.

With the threader 12 properly positioned with respect to an end of a pipe, with the follower ring 104 affixed to the chaser frame 32, and with the driven member 38 fastened to the drive shaft end 44, the power source is engaged with the drive head 86 and driven in a clockwise manner. The drive member 40 is thereby rotated so that the drive pin 84 engages the offset 60 of the cam 54 which rotates the driven member 38 through coacttion of the drive pin 84, the cam 54, and the supporting post 88. In turn, the driven member 38 rotates the drive shaft 26 which rotates the chaser frame 32 by the coaction of the pinion gear 18 and the ring gear 16. As the chaser frame 32 rotates, it moves forwardly toward the work holder 14; however, the drive shaft 26 and the bearing sleeve 28 remain in a fixed position. The drive member 40 and the driven member 38 also remain in a fixed position, being attached to the drive shaft 26, but the follower ring 104 moves with the chaser frame 32 and thus moves the guide ring 110 and the disengaging ring 112 along the main body 42 of the driven member 38. When the disengaging ring 112 moves off the end of the body 42, it contacts the connecting ring 94, which is slightly larger in diameter than the body 42, and moves it along with the chaser frame 32. This action begins to pull the cam supporting post 88 and the guide post 98 out of the plate 50 and through the chamber 52. However, the guide supporting post 88 continues to contact the edge 62 of the cam 54 and the cam 54 thereby remains in engagement with the drive pin 84 until the end of the post 88 is completely out of the chamber 52. Until this occurs, the drive pin 84 remains in full contact with the cam 54 and there is no increase in strain on either member nor is there a strain on the end of the post 88 because it fits closely in the passage 90 and the cam 54 fits closely with the sides of the chamber 52. This represents a marked improvement in the new thread length control device over those of the prior art in which strain on parts is increased as the parts separate.

When the end of the supporting post 88 is completely out of the chamber 52, the cam 54 is pushed downwardly due to the force of the drive pin 84, which easily overcomes the opposing force of the spring 66 (see FIG. 6). Hence, the driving member 40 is no longer engaged with the driven member 38 and further rotation of the member 40 does not move the driven member 38 because the drive pin 84 slips on past the offset portion 60 of the cam 54 during each rotation of the member 40.

The position of the disengaging ring 112 on the connecting rods 108 determines the point at which disengagement occurs, and it will be readily understood that the farther the ring 112 is moved toward the follower ring 104, the shorter will be the length of threads cut on the pipe before disengagement occurs.

When it is desired to back off the chasers 34 and the chaser frame 32 from the pipe, away from the work holder 14, the power source is simply reversed so as to guide the drive member 40 in the reverse direction or counterclockwise, as shown in FIG. 7. The guide pin 84 thereupon travels through about three-quarters of a revolution whereupon it contacts the point 64 of the cam 54 which is urged outwardly by the spring 66 and the spring member 70. Engagement of the drive pin 84 with the point 64 of the cam 54 thereupon causes the driven member 38 to be driven in a counterclockwise direction.

Various modifications of the above described embodiment of the invention will be apparent to those skilled in the art and such changes can be made without departing from the scope of the invention as defined in the appended claims.

What I claim is:

1. A detachable thread length control device for a pipe threader having a drive shaft for rotating a chaser frame, said device comprising a driven member adapted to fit over an end of the drive shaft of the threader, a drive member including a drive head connected thereto, a drive pin held by the other of said drive and driven members, a connecting cam pivotally attached to one of said drive and driven members for movement toward and away from said drive pin, said cam having an offset to contact said pin, a supporting post contacting said cam and maintaining said offset of said cam against said driving pin, and means for separating said supporting post from said cam when a predetermined length of thread has been cut.

2. A thread length control device according to claim 1 wherein said separating means comprises means attached to the chaser frame of said threader to longitudinally move said supporting post out of contact with said cam when the chaser frame has moved a predetermined distance.

3. A thread length control device according to claim 1 and means on said cam to lock said cam in engagement with said driving pin when said drive member is moved in a reverse direction.

4. A thread length control device according to claim 1 and resilient means for yieldably urging said cam outwardly toward the path of said drive pin.

5. A detachable thread length control device for a pipe threader having a drive shaft for rotating a chaser frame, said device comprising a driven member adapted to fit over an end of the drive shaft of the pipe threader, a drive member including a drive head connected thereto, a drive pin held by said drive member, a connecting cam pivotally attached to said driven member for movement toward and away from said drive pin, said cam having an offset to contact said pin, a supporting post contacting said cam and maintaining said offset of said cam against said driving pin, said supporting post being slidably held for longitudinal movement in said driven member, a connecting ring attached to said supporting post at the end of said driven member nearer the pipe threader, a follower ring adapted to be attached to the chaser frame, and a disengaging ring connected to said follower ring and slidable on said driven member, said disengaging ring contacting said connecting ring and longitudinally pulling said supporting post away from said cam when said chaser frame has moved a predetermined distance.

6. A thread length control device according to claim 5 characterized by said disengaging ring being connected to said follower ring by connecting posts and means for adjustably attaching said disengaging ring to said connecting posts.

References Cited in the file of this patent

UNITED STATES PATENTS

| | | |
|---|---|---|
| 915,144 | Witherell | Mar. 16, 1909 |
| 2,504,018 | Gibson | Apr. 11, 1950 |
| 2,753,575 | Ingwer | July 10, 1956 |